3,153,094
NITROSAMINE MANUFACTURE
Edward L. Reilly, Woodbury, N.J., assignor to E. I. du Pont de Nemours and Company, Wilmington, Del., a corporation of Delaware
No Drawing. Filed June 10, 1959, Ser. No. 819,222
7 Claims. (Cl. 260—576)

The present invention relates to a novel process for the preparation of valuable chemical intermediates. The invention relates specifically to a novel process for the preparation of secondary nitrosamines, disubstituted ammonium nitrites, and novel intermediate products by adding nitric oxide to secondary amines. The invention also relates to novel salts and alkylated derivatives of the novel intermediates produced in this process. This application is a continuation-in-part of my co-pending application Serial No. 582,084, filed May 2, 1956, which, in turn, is a continuation-in-part of my application Serial No. 489,275 filed February 18, 1955, both now abandoned.

Nitrosamines, which are useful as insecticides and as chemical intermediates, especially in the preparation of substituted hydrazines, are generally prepared by the nitrosation of a secondary amine by nitrous acid added per se or generated by the reaction of a metal nitrite and a mineral acid. Disubstituted ammonium nitrites, which are known to be especially useful as corrosion inhibitors, are generally prepared by the reaction in aqueous solution of an alkali metal nitrite and a soluble salt of the amine, i.e., the amine hydrochloride. The known processes for the preparation of nitrosamines and disubstituted ammonium nitrites, which obviously are very similar, both have the disadvantage that a worthless and hard-to-remove metal salt is produced as a by-product, and separation of the aqueous phase is necessary. Moreover, the known methods for the preparation of the nitrosamines are not altogether suitable for the preparation of nitrosamines of secondary amines having reactive substituents such as hydroxy, halo, cyano, carbonyl, carboxyl, carboxyalkyl, and nitro groups.

An object of the present invention is to provide an improved process for the nitrosation of amines. Another object of the invention is to provide a simple and inexpensive process for the preparation of nitrosamines and/or disubstituted ammonium nitrites in which the formation of undesirable by-products is avoided. Another object of the invention is to provide a simple and inexpensive process for the preparation of novel addition products of nitric oxide and secondary amines. Additional objects will become apparent as the invention is more fully described.

I have found that the foregoing and related objects are realized by adding nitric oxide to a secondary amine or to a tertiary amine having at least one alkyl group attached to the amino nitrogen. The nitric oxide preferably is added at elevated pressures in order to increase the rate of the reaction. The maximum reaction temperature depends on the decomposition point of the product under the proscribed reaction conditions. The desired products may be obtained by suitable control of the reaction conditions, and no undesirable by-products difficult to remove from the reaction mixture are formed in this process. The use of simple and complex salts of variable-valence metals as catalysts in the present process generally gives markedly improved results in the yields of product obtained, the rate of reaction, and the like. Suitable salts include the sulfides, halides, cyanides, nitrates, and pyridinium chlorides of manganese, chromium, cobalt, nickel, tin, iron, and copper, as well as the nitric oxide complexes of the salts of these metals. The nitric oxide complexes are readily formed in situ under the conditions of my process. Supported nickel, palladium, and rhodium catalysts likewise generally improve the yields and accelerate the reaction in the present process, carbon-supported palladium being particularly effective.

Nitric oxide may be added during the course of the reaction to replace that consumed in the reaction. By nitric oxide in the present specification and claims is meant gaseous NO substantially free of higher oxides of nitrogen or other reactive gases such as oxygen. However, the nitric oxide may be diluted by a gas which does not participate in the reaction, for example, nitrogen or steam, to moderate the reaction. Ammonia oxidation gases may be used, provided that these gases are substantially free of higher oxides of nitrogen. The excess gas may be recovered by conventional means.

The process can be carried out batchwise or continously. Since the products obtained depend on the reaction conditions, the following examples are given to illustrate specific embodiments of the method of carrying out the present invention. Parts are by weight unless otherwise specified. Conversions are based on the amine used as starting material.

*Example 1*

An autoclave containing 34 parts of dimethylamine and 1.0 part of cupric chloride was pressurized to 270 p.s.i.ga. with nitric oxide. A maximum temperature of 97° C. was attained. When the pressure in the autoclave decreased, additional nitric oxide was added intermittently to raise the pressure to the initial level. At the end of 5 hours, the autoclave was cooled and vented. Distillation of the reaction product yielded 40 parts (71% conversion and yield) of dimethylnitrosamine. Similar yields of dimethylnitrosamine are obtained in the reaction of the amine and nitric oxide when the cupric chloride is replaced by a small amount of 10% palladium-on-charcoal. In this case, no external heating is needed and the reaction preferably is effected in a solvent medium, e.g., methanol or 95% ethanol.

When a mixture of 34 parts of dimethylamine and 50 parts of water was treated with nitric oxide at 235 p.s.i.ga. and 93° C. for 4 hours, and the reaction mixture was extracted with ether, evaporation of the ether extract yielded 2.5 parts (4.5/ conversion) of dimethylnitrosamine.

*Example 2*

An autoclave containing 35 parts of diethylamine was pressurized to 300 p.s.i.ga. with nitric oxide. A maximum temperature of 104° C. was attained. When the pressure in the autoclave decreased, additional nitric oxide was added to raise the pressure to the initial level. At the end of 4 hours, the autoclave was cooled and vented. Distillation of the reaction product yielded 3 parts of unreacted diethylamine and 32 parts (64% conversion, 70% yield) of diethylnitrosamine.

*Example 3*

An autoclave containing 20 parts of triethylamine and 2 parts of ferrous sulfide was pressurized to 300 p.s.i.ga.

with nitric oxide at 27° C. A maximum temperature of 140° C. was attained. At the end of 5 hours, the autoclave was cooled and vented. Distillation of the reaction mixture yielded 3 parts of diethylnitrosamine (15% conversion).

Example 4

Nitric oxide was bubbled into a reaction vessel containing 50 parts of diethylamine and 1 part of cupric chloride at 51° C. After three hours, the reaction vessel was cooled. Distillation of the reaction mixture produced 40 parts of unreacted diethylamine and 3.5 parts (5% conversion, 25% yield) of diethylnitrosamine.

Example 5

An autoclave containing 50 parts of diethylamine and 2 parts of cupric chloride was pressurized to 300 p.s.i.ga. with nitric oxide. The mixture was heated to initiate the reaction, and a maximum temperature of 120° C. was attained. When the pressure decreased, additional nitric oxide was added intermittently to bring the pressure to the initial level. At the end of 3 hours, the autoclave was cooled and vented. Distillation of the reaction mixture produced 65 parts (93% conversion and yield) of diethylnitrosamine.

A 93% conversion and yield to diethylnitrosamine also was obtained when an identical mixture was treated with nitric oxide at 300 p.s.i.ga. and 56° C. for 2½ hours. However, when the addition of nitric oxide to diethylamine at 280 p.s.i.ga. and in the presence of the cupric chloride catalyst took place at 167° C., the conversion to nitrosamine decreased to 72%. The decrease in yield was due to decomposition of the nitrosamine in the reaction vessel.

Example 6

An autoclave containing 50 parts of diethylamine and 1 part of ferrous sulfide was pressurized to 300 p.s.i.ga. with nitric oxide at 30° C. The mixture was heated to initiate the reaction, and the temperature rose to 96° C. When the pressure decreased, additional nitric oxide was added to raise the pressure to the initial level. At the end of 5½ hours, the autoclave was cooled and vented. Distillation of the reaction product produced 63 parts (90% conversion and yield) of diethylnitrosamine.

Example 7

An autoclave containing 50 parts of diethylamine, 50 parts of pyridine, and 1.3 parts of manganous sulfide was pressurized to 300 p.s.i.ga. with nitric oxide. The mixture was heated to initiate the reaction, and a maximum temperature of 100° C. was attained. When the pressure decreased, additional nitric oxide was introduced to raise the pressure to the initial level. At the end of 6 hours, the autoclave was cooled and vented. Distillation of the reaction product produced 58.5 parts (84% conversion and yield) of diethylnitrosamine.

Example 8

An autoclave containing a mixture of 50 parts of di-n-propylamine and 12 parts of 10% palladium-on-charcoal was pressurized to 300 p.s.i.ga. with nitric oxide at 30° C. The temperature rose to a maximum of 59° C. When the pressure decreased, additional nitric oxide was added intermittently to raise the pressure to the initial level. After 2½ hours, when further nitric oxide absorption was no longer apparent, the autoclave was cooled and vented. Distillation of the filtered reaction mixture yielded 58 parts (98% conversion and yield) of di-n-propylnitrosamine.

Example 9

An autoclave containing a mixture of 25 parts of diisopropylamine, 2 parts of 10% palladium-on-charcoal, and 50 parts of 95% ethanol was pressurized to 230 p.s.i.ga. with nitric oxide. The mixture was heated to initiate the reaction, and a maximum temperature of 76° C. was attained. When the pressure decreased, additional nitric oxide was introduced to raise the pressure to the initial level. At the end of 4 hours, the autoclave was cooled and vented. After evaporation of the ethanol and washing of the solid residue, 28 parts (84% conversion and yield) of diisopropylnitrosamine was obtained.

Example 10

An autoclave containing a mixture of 25 parts of diethylamine, 25 parts of methanol, and 2 parts of 5% rhodium-on-charcoal was pressurized to 288 p.s.i.ga. with nitric oxide. The autoclave was heated, and a maximum temperature of 53° C. was attained. When the pressure decreased, additional nitric oxide was added intermittently to raise the pressure to the initial level. At the end of 4 hours, the autoclave was cooled and vented. After evaporation of the methanol and distillation of the residue, 25.5 parts (72% conversion) of diethylnitrosamine was obtained.

Example 11

An autoclave containing a mixture of 25 parts of dicyclohexylamine and 2 parts of cupric chloride was pressurized to 250 p.s.i.ga. with nitric oxide. The mixture was heated to initiate the reaction, and a maximum temperature of 80° C. was attained. At the end of 6 hours, the autoclave was cooled and vented. Recrystallization of the solid reaction product from ethanol produced 25 parts (86% conversion and yield) of dicyclohexylnitrosamine.

Example 12

An autoclave containing a mixture of 25 parts of dicyclohexylamine, 2 parts of nickel-on-charcoal, and 50 parts of 95% ethanol was pressurized to 300 p.s.i.ga. with nitric oxide. The mixture was heated to initiate the reaction, and a maximum temperature of 93° C. was attained. When the pressure decreased, additional nitric oxide was introduced to raise the pressure to the initial level. At the end of 7 hours, the autoclave was cooled and vented. After removal of ethanol by evaporation and recovery of unreacted amine by vacuum distillation, 9 parts (31% conversion) of solid dicyclohexylnitrosamine was obtained.

The nickel-on-charcoal is a less active catalyst than palladium-on-charcoal. When 10% palladium-on-charcoal was substituted for the nickel-on-charcoal and the reaction was carried out under essentially the same reaction conditions as in the above example, 91 parts (86% conversion and yield) of the dicyclohexylnitrosamine was obtained. The palladium catalyst is also used to advantage in the preparation of dicyclopentylnitrosamine from the corresponding secondary amine and nitric oxide.

Example 13

An autoclave containing a mixture of 55 parts of piperidine, 2 parts of palladium-on-charcoal, and 50 parts of 95% ethanol was pressurized to 215 p.s.i.ga. with nitric oxide. The temperature rose to a maximum of 36° C. When the pressure decreased, additional nitric oxide was introduced to raise the pressure to the initial level. At the end of 3 hours, the autoclave was vented. The reaction product was filtered to remove the catalyst and, on distillation of the filtrate, 6 parts of unreacted piperidine and 39 parts (57% conversion, 66% yield) of N-nitrosopiperidine was obtained.

Hexamethyleneimine and morpholine react under essentially the same conditions to yield N-nitrosohexamethyleneimine and N-nitrosomorpholine, respectively.

Example 14

An autoclave containing 50 parts of pyrrolidine and 2 parts of 10% palladium-on-charcoal was pressurized to 300 p.s.i.ga. with nitric oxide at 28° C. A maximum temperature of 64° C. was attained. When the pressure decreased, additional nitric oxide was added to raise the pressure to the initial level. At the end of 2 hours, the autoclave was vented and the reaction mixture obtained was filtered and vacuum distilled. N-nitrosopyrrolidine was obtained in 80% conversion (56 parts).

*Example 15*

An autoclave containing 50 parts of N-benzyl-N-methylamine, 50 parts of methanol, and 2 parts of 10% palladium-on-charcoal was pressurized to 275 p.s.i.ga. with nitric oxide at 26° C. The temperature rose to a maximum of 38° C. When the pressure decreased, additional nitric oxide was added to raise the pressure to the initial level. At the end of 5½ hours, the autoclave was vented. Water was added to the reaction mixture to separate the layers, and after separation of the layers and distillation of the oily layer, 52 parts (89% conversion and yield) of N-benzyl-N-methylnitrosamine was obtained. The N-nitroso derivatives of other N-alkyl N-aralkyl amines and of N,N-diaralkyl amines such as bis(phenylethyl)amine and bis(phenylpropyl)amine are prepared similarly.

*Example 16*

An autoclave containing a mixture of 25 parts of diphenylamine, 25 parts by volume of pyridine, and 1 part of cupric chloride was pressurized to 300 p.s.i.ga. with nitric oxide. The mixture was heated to initiate the reaction, and a maximum temperature of 84° C. was attained. When the pressure decreased, additional nitric oxide was introduced to raise the pressure to the initial level. At the end of 2½ hours, the autoclave was cooled and vented. The reaction product was distilled under vacuum to remove the pyridine, and the residue was dissolved in hot ethanol, cooled, and filtered. Twenty-two parts (76% conversion) of diphenylnitrosamine was obtained. N-phenyl-$\beta$-naphthylamine reacts under similar conditions to yield N-phenyl-$\beta$-naphthylnitrosamine.

*Example 17*

An autoclave containing a mixture of 25 parts of N-ethylaniline, 25 parts of methanol and 2 parts of 10% palladium-on-charcoal was pressurized to 300 p.s.i.ga. with nitric oxide at 28° C. The mixture was heated to initiate the reaction, and a maximum temperature of 78° C. was attained. When the pressure decreased, additional nitric oxide was introduced to raise the pressure to the initial level. At the end of 4 hours, the autoclave was cooled and vented. The reaction product was filtered to remove the catalyst. When the filtrate was distilled, 26 parts (84% conversion) of N-nitroso-N-ethylaniline was obtained.

*Example 18*

An autoclave containing a mixture of 20 parts of N,N-dimethylaniline, 100 parts of pyridine, and 2 parts of manganous sulfide was pressurized to 330 p.s.i.ga. with nitric oxide. The mixture was heated to initiate the reaction, and a maximum temperature of 93° C. was attained. When the pressure decreased, additional nitric oxide was introduced to raise the pressure to the initial level. At the end of 2 hours, the autoclave was cooled and vented. The reaction product was washed with ether, filtered, and the ether removed by evaporation. Distillation of the residue produced 10 parts (45% conversion) of a solid which was shown to be N-nitroso-N-methylaniline by mixed melting point and refractive indices.

*Example 19*

An autoclave containing a mixture of 16 parts of N-methyl-p-toluidine, 25 parts of methanol, and 2 parts of 10% palladium-on-charcoal was pressurized to 300 p.s.i.ga. with nitric oxide at 29° C. A maximum temperature of 75° C. was attained. When the pressure decreased, additional nitric oxide was introduced intermittently to raise the pressure to the initial level. At the end of 5 hours, the autoclave was cooled and vented. The reaction product was filtered to remove the catalyst, the methanol was removed from the filtrate by evaporation, and the product was recrystallized from petroleum ether. Thirteen parts (66% conversion and yield) of a solid was obtained which was shown to be N-nitroso-N-methyl-p-toluidine by elemental analysis and infrared spectroscopy.

*Example 20*

An autoclave containing a mixture of 50 parts of diethanolamine and 8 parts of copper pyridinium chloride was pressurized to 300 p.s.i.ga. with nitric oxide. The mixture was heated to initiate the reaction, and a maximum temperature of 97° C. was attained. When the pressure decreased, additional nitric oxide was introduced to raise the pressure to the initial level. At the end of 6½ hours, the autoclave was cooled and vented. N-nitrosodiethanolamine was obtained in 90% yield (22.5 parts).

Similarly, an autoclave containing a mixture of 50 parts of diethanolamine, 5 parts of 10% palladium-on-charcoal, and 35 parts of methanol was pressurized to 300 p.s.i.ga. with nitric oxide. A maximum temperature of 53° C. was achieved. The pressure was maintained at the initial level by the addition of nitric oxide when necessary. After 6 hours, the autoclave was cooled and vented and N-nitrosodiethanolamine was obtained in greater than 95% conversion and yield following removal of the catalyst by filtration and evaporation of the solvent.

*Example 21*

An autoclave containing a mixture of 25 parts of bis($\beta$-cyanoethyl)amine, 2 parts of cupric chloride, and 25 parts of methanol was pressurized to 300 p.s.i.ga. with nitric oxide at 20° C. The mixture was heated to initiate the reaction, and a maximum temperature of 74° C. was attained. When the pressure decreased, additional nitric oxide was added to raise the pressure to the initial level. At the end of 5 hours, the autoclave was allowed to cool. The mixture was left in the autoclave overnight, and then the autoclave was vented. The reaction mixture was passed through an alumina column, and the methanol was removed by evaporation. Twenty-three parts (74% conversion and yield of bis($\beta$-cyanoethyl)nitrosamine was obtained.

*Example 22*

An autoclave containing a mixture of 5 parts of 2,2',4,4'-tetrachlorodiphenylamine, 2 parts of 10% palladium-on-charcoal, and 50 parts of 95% ethanol was pressurized to 170 p.s.i.ga. with nitric oxide. The mixture was heated to initiate the reaction and a maximum temperature of 90° C. was attained. At the end of 7 hours, the autoclave was cooled and vented. Removal of the catalyst and the unreacted starting material by filtration, followed by evaporation of the filtrate yielded 2 parts (40% conversion, 80% yield) of a pale yellow solid, which, when recrystallized from 95% ethanol, had a melting point of 66–67° C. Elemental analysis of this solid (C, 43.4%; H, 2.0%; N, 8.3%; and Cl, 42.4%) indicated that this compound is 2,2',4,4',-tetrachlorodiphenylnitrosamine. This novel compound can be used as an insecticide per se or can serve as an intermediate in the preparation of the corresponding useful hydrazine.

The foregoing examples illustrate that the nitrosation reaction is general for all secondary amines and for tertiary amines having at least one alkyl group attached to the amino nitrogen. The tertiary amines are nitrosated by cleavage of an alkyl group and formation of the nitroso derivative of the corresponding secondary amine. Secondary and tertiary alkyl amines, such as dimethylamine, triethylamine, diethylamine, methyldiethylamine, di-n-propylamine, diisopropylamine, methyldipropylamine, methylhexylamine, dihexylamine, dioctylamines, N,N'-dimethylethylenediamine, diethanolamine, methyl-bis(nitroethyl)amine, bis-(halobutyl)amines and bis(cyanoethyl)-amine; secondary and tertiary cycloalkyl amines, such as dicyclohexylamine, dicyclopentylamine, and methyldicyclohexylamine; saturated heterocyclic amines, such as piperidine, β-ethylpiperidine, pyrrolidine, N-methylpiperidine, hexamethyleneimine, piperazine, and morpholine; secondary aryl amines and alkyl aryl amines, such as diphenylamine, N-methyl- and N-ethylaniline, N-methyltoluidine and N,N-dimethylphenylenediamines; and dialkyl aryl amines, such as N,N-dimethylaniline, N-methyl-N-isobutylaniline, and N,N-dimethyltoluidine, may be nitrosated by the process of this invention.

All these amines may be described generally by the formulas:

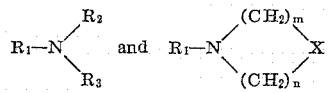

in which $R_1$ signifies hydrogen or an alkyl radical; $R_2$ and $R_3$ are independently selected from saturated aliphatic hydrocarbon radicals, aralkyl radicals, and aryl radicals; X signifies a —$CH_2$— radical or a hetero atom or radical, particularly —O— or —NH—; and $m$ and $n$ are integers such that the total number of ring members is a maximum of about 7. In the formulas pictured here and hereinafter, it is to be understood that when more than one amino group is present in the same molecule, i.e., where $R_2$ and/or $R_3$ contain secondary or tertiary amino substituents or where X is —NH—, such multiple amino groups are independently reactive with nitric oxide in the present process. By the term "saturated alphatic hydrocarbon radicals" in the present specification and claims, I intend to include all acyclic and monocyclic radicals fitting the general formulas $C_nH_{2n+1}$ and $C_nH_{2n-1}$, respectively, in which one or more of the hydrogens may be replaced by a radical which is nonreactive with nitric oxide in the present process. Such substituents as hydroxy, halo, cyano, carbonyl, carboxyl, carboxyalkyl, and nitro groups have been found to be substantially inert in the process. Based primarily on considerations of ready availability and only secondarily, if at all, on considerations of reactivity, I prefer to use secondary and tertiary amines in which the saturated aliphatic hydrocarbon substituents contain a maximum of about 8 carbon atoms. "Aryl" and "aralkyl" (i.e., aryl-substituted alkyl) in the present specification and claims are intended to include particularly the mononuclear carbocyclic radicals of the benzene series, but other types of carbocyclic aryl radicals, including the fused polynuclear aryl radicals, are also suitable. As in the case of the saturated aliphatic and heterocyclic radicals, the aryl groups may bear substituents which are unreactive with nitric oxide under the process conditions.

Although, as is illustrated by Example 4, the reaction may be carried out at atmospheric pressure, higher pressures generally are used in order to attain satisfactorily short reaction times. The pressure in the present process is limited only by equipment and economic considerations but preferably is between 100 and 400 p.s.i.ga. The maximum reaction temperature is limited only by the decomposition point of the nitrosamine formed; temperatures near 100° C. generally are sufficient to effect the reaction. Lower temperatures may be used when a catalyst is present or when the addition of nitric oxide is carried out for long periods of time, e.g., 2–6 hours. As is particularly evident from the runs of Example 1, variable-valence-metal salt catalysts, e.g., the sulfides, chlorides, bromides, cyanides, nitrates, and pyridinium chlorides of manganese, chromium, cobalt, nickel, tin, copper, and iron, materially improve the yields of nitrosamines over those obtained when no catalyst is used. The alternative use of supported metal catalysts i.e., supported nickel and noble metals, particularly supported palladium, likewise gives high yields and accelerates the rate of reaction of the nitric oxide with the amines. When the addition of nitric oxide to the amines takes place in the presence of a supported metal catalyst such as palladium-, nickel-, or rhodium-on-charcoal, the nitrosamine is formed more rapidly at lower temperatures than when no catalyst is present or when a variable-valence-metal salt catalyst is used. The supported metal catalysts are particularly desirable with amines of low reactivity, such as diethanolamine and diphenylamine. Solid amines may be dissolved in a suitable solvent. The process may be carried out continuously by passing a mixture of the secondary or tertiary amine and the nitric oxide as co- or countercurrent streams through a reactor which preferably is packed with a supported variable-valence-metal salt or one of the supported metal catalysts. Short contact times may be employed to permit the use of higher temperatures without excess loss due to decomposition of the product. The reaction product recovered from the reactor need only be distilled or recrystallized to separate the water of reaction from the desired nitrosamine.

I have also found that the reaction of nitric oxide and a secondary amine in which the hydrocarbon substituent or substituents on the amino nitrogen are saturated aliphatic can be directed to produce a mixture of a disubstituted ammonium nitrite and the corresponding nitrosamine. Secondary amines in which the hydrocarbon substituents contain benzenoid unsaturation do not yield the substituted ammonium nitrites and hence another mechanism must be involved in the formation of nitrosamines thereform.) The nitrite-nitrosamine mixture can be separated easily because of the different solubilities of the salt and the nitrosamine. The disubstituted ammonium nitrites can be converted to the corresponding nitrosamines by heating to temperatures below the decomposition point of the nitrosamine in the presence of a variable-valence-metal salt. However, when these ammonium nitrites are heated in the presence of a supported metal catalyst under the conditions for the nitrosation of a secondary amine to the nitrosamine (0–100° C., 0–400 p.s.i.ga.), the corresponding nitrosamines are not formed. Hence, different catalytic mechanisms must be involved, and only in the absence of catalyst or in the presence of the variable-valence-metal salt catalyst is the disubstituted ammonium nitrite an intermediate in the preparation of nitrosamines.

The following examples illustrate specific embodiments of the method of carrying out this phase of the present invention. Parts are by weight unless otherwise specified and, as before, conversions are based on the amine being treated.

Example 23

An autoclave containing 25 parts of diisopropylamine, 15 parts of methanol, and 10 parts of water was pressurized to 300 p.s.i.ga. with nitric oxide at 27° C. At the end of 30 minutes, the autoclave was vented. The alcohol and unconverted diisopropylamine (8.5 parts) were removed by evaporation, and the residue was slurried with petroleum ether. When the slurry was filtered, 8 parts (22% conversion, 33% yield) of diisopropylammonium nitrite was obtained. Evaporation of the filtrate yielded 0.5 part (1.5% conversion, 2.3% yield) of diisopropylnitrosamine.

Example 24

An autoclave containing 25 parts of diisopropylamine, 25 parts of methanol, and 0.03 part of cuprous cyanide was pressurized to 300 p.s.i.ga. with nitric oxide at 24° C. When the pressure decreased, additional nitric oxide was added to raise the pressure to the initial level. At the end of 30 minutes, the autoclave was vented. Following the procedure of the previous examples, 7.7 parts (21% conversion, 31% yield) of diisopropylammonium nitrite and 2 parts (6% conversion and 8% yield) of diisopropylnitrosamine were obtained. Approximately 8 parts of unreacted diisopropylamine was recovered after evaporation of the methanol.

When an identical mixture of reactants was subjected to the action of nitric oxide at 300 p.s.i.ga. and 24° C. for an hour, 15.5 parts of 42% conversion, 54% yield) of the diisopropylammonium nitrite and 6 parts (18% conversion, 24% yield) of diisopropylnitrosamine were obtained.

*Example 25*

An autoclave containing 25 parts of diisopropylamine, 25 parts of methanol, and 0.07 part of cupric chloride was pressurized to 300 p.s.i.ga. with nitric oxide at 0° C. The temperature rose to a maximum of 24° C. At the end of 30 minutes, the autoclave was vented. The reaction mixture was passed through an alumina column, the methanol was evaporated, and the residue was slurried with petroleum ether. The mixture was then filtered to obtain 11 parts (30% conversion) of diisopropylammonium nitrite. Distillation of the filtrate produced 2.5 parts (7.7% conversion, 11% yield) of diisopropylnitrosamine and 7.8 parts of unconverted diisopropylamine.

*Example 26*

An autoclave containing 25 parts of diisopropylamine and 1.0 part of cupric chloride was pressurized to 250 p.s.i.ga. with nitric oxide at room temperature (23° C.). When the pressure in the autoclave decreased, additional nitric oxide was added to raise the pressure to the initial level. At the end of 5 hours, the reaction mixture was slurried in petroleum ether. Filtration of the slurry yielded 13 parts (35% conversion) of diisopropylammonium nitrite. Distillation of the filtrate yielded 6 parts (18% conversion) of diisopropylnitrosamine.

*Example 27*

An autoclave containing 25 parts of di-n-butylamine, 25 parts of methanol, and 0.1 part of cupric chloride was pressurized to 300 p.s.i.ga. with nitric oxide at 0° C. At the end of 8 minutes, the autoclave was vented. After removal of the alcohol and unreacted amine (10.2 parts), the residue was slurried with petroleum ether. When the slurry was filtered, 11.9 parts (34% conversion, 58% yield) of di-n-butylammonium nitrite was obtained. Evaporation of the filtrate yielded 6.9 parts (23% conversion, 38% yield) of di-n-butylnitrosamine.

*Example 28*

An autoclave containing 25 parts of di-n-butylamine, 25 parts of methanol, and 0.05 part of cupric chloride was pressurized to 100 p.s.i.ga. at 0° C. The temperature rose to a maximum of 21° C. At the end of 30 minutes, the autoclave was vented. When the reaction mixture was treated as described in the preceding example, 12.2 parts (35% conversion, 52% yield) of di-n-butylammonium nitrite and 4 parts (13% conversion, 19% yield) of di-n-butylnitrosamine were obtained.

When an identical mixture was pressurized to 400 p.s.i.ga. at 0° C., the maximum temperature attained was 34° C., and when, after 30 minutes, the autoclave was vented and the mixture treated as described in the preceding example, 13.1 parts (38% conversion, 43% yield) of di-n-butylammonium nitrite and 12.5 parts (43% conversion, 46% yield) of di-n-butylnitrosamine were obtained.

*Example 29*

An autoclave containing a mixture of 50 parts of di-n-butylamine and 0.1 part of cupric chloride was pressurized to 260 p.s.i.ga. with nitric oxide at 24° C. The temperature rose to a maximum of 38° C. Nitric oxide was added to raise the pressure to the initial level. At the end of 17 hours, the autoclave was vented. Distillation of the reaction mixture produced 55 parts (89% conversion and yield) of di-n-butylnitrosamine. No nitrite was obtained.

*Example 30*

An autoclave containing 25 parts of di-n-butylamine and 0.01 part of cupric chloride was pressurized to 300 p.s.i.ga. with nitric oxide at 50° C. The temperature rose to a maximum of 70° C. At the end of 30 minutes, the autoclave was cooled and vented. The reaction mixture was passed through an alumina column to remove the catalyst, washed with methanol, the methanol was evaporated, and the residue was slurried with carbon tetrachloride. Analysis indicated that 18.8 parts (55% conversion and yield) of di-n-butylammonium nitrite and 13.0 parts (43% conversion and yield) of di-n-butylnitrosamine were obtained.

*Example 31*

An autoclave containing 25 parts of diisobutylamine, 25 parts of methanol, and 0.05 part of cupric chloride was pressurized to 300 p.s.i.ga. with nitric oxide at 28° C. The temperature rose to a maximum of 34° C. At the end of 30 minutes, the autoclave was vented. The reaction mixture was passed through an alumina column to remove the catalyst, the methanol evaporated under vacuum, and ether added to the residue to precipitate the nitrite. Six parts (18% conversion, 21% yield) of diisobutylammonium nitrite was recovered by filtration. The filtrate yielded 4 parts of unreacted amine and 8 parts (26% conversion, 31% yield) of diisobutylnitrosamine.

*Example 32*

An autoclave containing 25 parts of dicyclohexylamine, 25 parts of methanol, and 0.07 part of cupric chloride was pressurized to 300 p.s.i.ga. with nitric oxide at 20° C. The temperature rose to a maximum of 29° C. At the end of 15 minutes, the autoclave was vented. The reaction mixture was passed through an alumina column, the column was washed with methanol, the methanol was evaporated at 10 millimeters pressure. When petroleum ether was added to the residue, 14.8 parts (47% conversion, 74% yield) of dicyclohexylammonium nitrite precipitated out. When the filtrate was distilled under 5 millimeters pressure, 9 parts of dicyclohexylamine was recovered and 1.2 parts (4% conversion, 7% yield) of dicyclohexylnitrosamine was found as residue.

*Example 33*

An autoclave containing 25 parts of dicyclohexylamine, 25 parts of methanol, and 0.4 part of ferrous chloride was pressurized to 300 p.s.i.ga. with nitric oxide at 25° C. At the end of 30 minutes, the autoclave was vented. The reaction mixture was passed through an alumina column and the residue slurried with ether. Filtration of the slurry produced 2.8 parts (9% conversion, 17% yield) of dicyclohexylammonium nitrite. After evaporation of the ether from the filtrate, distillation of the residue produced 12.8 parts of unconverted dicyclohexylamine and 4.5 parts (16% conversion, 31% yield) of dicyclohexylnitrosamine.

*Example 34*

An autoclave containing 25 parts of dicyclohexylamine, 25 parts of methanol, and 0.07 part of cupric chloride was pressurized to 300 p.s.i.ga. at 70° C. At the end of 15 minutes, the autoclave was cooled and vented. The reaction mixture was passed through an alumina column to remove the catalyst, the methanol was removed by evaporation, and the residue was slurried with petroleum ether. The slurry was filtered, and 6 parts (19% conversion and yield) of dicyclohexylammonium nitrite was obtained. The filtrate yielded on distillation 21.3 parts (73% conversion and yield) of dicyclohexylnitrosamine.

The conversion to disubstituted ammonium nitrite and the ratio of nitrite to nitrosamine in the product depend on a number of interdependent reaction variables. This interdependence is illustrated in the following table. In each case, an autoclave containing di-n-butylamine (0.195 mole) and cuprous chloride, as model amine and catalyst, respectively, was pressurized to 300 p.s.i.ga. with nitric oxide at room temperature. The conversions are based on the amine. Methanol (0.781 mole) was used as the solvent when indicated.

| Run No. | Moles of Catalyst ×10⁻⁴ | Solvent Used | Max. Temp. (° C.) | Contact Time (min.) | Product Nitrite (Percent yield) | Product Nitrosamine (percent yield) | Nitrite to Nitrosamine, Mole Ratio | Unreacted Amine (moles) |
|---|---|---|---|---|---|---|---|---|
| 1 | 58 | No | 41 | 30 | 4 | 85 | 0.05 | 0.029 |
| 2 | 5.8 | No | 44 | 30 | 26 | 56 | 1.0 | 0.005 |
| 3 | 58 | No | 37 | 15 | 26 | 40 | 0.6 | 0.024 |
| 4 | 5.8 | No | 43 | 15 | 33 | 49 | 0.7 | 0.039 |
| 5 | 58 | Yes | 51 | 15 | 6 | 82 | 0.07 | 0.001 |
| 6 | 5.8 | Yes | 39 | 15 | 49 | 35 | 1.3 | 0.036 |
| 7 | 58 | Yes | 40 | 30 | 4 | 92 | 0.04 | 0.000 |
| 8 | 5.8 | Yes | 36 | 30 | 46 | 46 | 1.0 | 0.003 |
| 9 | 0.58 | Yes | 30 | 30 | 36 | 32 | 1.1 | 0.052 |
| 10 | 58 | No | 33 | 226 | 0 (conv.) | 71 (conv.) | 0.0 | ---------- |
| 11 | 0.58 | No | 30 | 30 | 24 | 27 | 1.0 | 0.100 |
| 12 | 0.58 | No | 70 | 30 | 55 | 43 | 1.3 | 0.00 |
| 13 | 2.9 | Yes | 22 | 30 | 60 | 32 | 1.9 | 0.041 |
| 14 | ¹ None | Yes | 32 | 30 | 33 | 2 | 13.5 | 0.084 |

¹ 0.248 mole of diisopropylamine substituted for di-n-butylamine.

The completeness of the reaction and the ratio of nitrite to nitrosamine in the product depend on the competing interrelationships which exist between temperature, retention time, catalyst concentration, and presence of solvent. Thus, for example, the ratio of nitrite to nitrosamine in the final product depends on the decomposition of the nitrite to the nitrosamine, and, as would be expected, lower ratios are obtained at longer retention times and higher catalyst to amine ratios. However, as is illustrated by the preceding table, these effects can be modified by varying other reaction variables.

I further have found that when the addition of nitric oxide to secondary amines containing at least one methylene group alpha to the amino nitrogen takes place at temperatures below 66° C. in the absence of a solvent, novel, white metastable solids, which melt with decomposition to form nitric oxide, the original amine, and small amounts of the corresponding nitrosamine and nitrite, are formed. Elemental and infrared analyses and the preparation and characterization of certain derivatives to be described more fully hereinafter all indicate that these solids are amine-nitric oxide addition products corresponding to one of the general formulas:

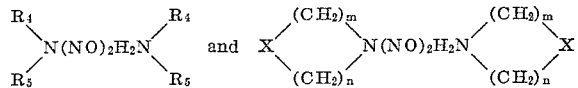

wherein $R_4$ and $R_5$ signify saturated aliphatic hydrocarbon radicals providing one or more methylene groups alpha to the amino nitrogen and X, $m$ and $n$ have the aforedefined significance. By the term "methylene" in the present specification and claims, I intend to include not only the $CH_2$ radical but also the methyl radical, which may be written

Addition products of secondary amines other than those in which there is a methylene group alpha to the amino nitrogen may be formed but probably are too unstable to be isolated under the reaction conditions used.

The following examples illustrate specific embodiments of this phase of the present invention. Parts are by weight unless otherwise specified. Conversions are based on the starting amine.

*Example 35*

An autoclave containing 34 parts of dimethylamine was pressurized to 210 p.s.i.ga. with nitric oxide at 22° C. The temperature rose to a maximum of 41° C. When the pressure in the autoclave decreased, additional nitric oxide was added to raise the pressure to the initial level. At the end of 2 hours, the autoclave was vented. The white, solid, metastable reaction product (47 parts) was stored in a vacuum desiccator. When air was admitted to the desiccator, white fumes appeared and an exothermic reaction occurred which produced a liquid which, on distillation, yielded 17 parts of dimethylnitrosamine.

*Example 36*

An autoclave containing 28 parts of dimethylamine was pressurized to 300 p.s.i.ga. with nitric oxide at 6° C. A maximum temperature of 25° C. was attained. When the pressure decreased, additional nitric oxide was introduced to raise the pressure to its initial level. At the end of 3 hours, the autoclave was cooled and flushed with nitrogen. When the white, metastable solid which appeared in the autoclave was heated to 78° C. under a maximum pressure of 219 p.s.i.ga., the solid decomposed to a liquid. When the autoclave was cooled and vented, 5 parts of dimethylamine was found in the Dry-Ice trap. Distillation of the liquid in the autoclave produced 18 parts of diamethylnitrosamine (40% conversion, 49% yield).

*Example 37*

An autoclave containing 100 parts of diethylamine was pressurized to 300 p.s.i.ga. with nitric oxide. The mixture was heated to initiate the reaction, and a maximum temperature of 35° C. was attained. When the pressure decreased, additional nitric oxide was added to bring the pressure up to its initial level. After 3½ hours, the autoclave was vented. One hundred and seventeen parts (83% conversion and yield) of a white, metastable solid which melted with decomposition at 84–93° C. was obtained. When an aqueous solution of this solid (20 parts) was added to an aqueous solution of cupric pyridinium chloride, 3 parts (15% conversion) of diethylnitrosamine was obtained. When 23 parts of the white, metastable solid obtained by the addition of nitric oxide to diethylamine at 400 p.s.i.ga. at 25° C. was dissolved in 100 parts by volume of methanol, gas was evolved. The methanol was removed by vacuum evaporation, and 9 parts of diethylammonium nitrite and 7 parts of diethylnitrosamine were recovered from the residue.

*Example 38*

An autoclave containing 50 parts of diethylamine and 1 part of cupric chloride was pressurized at 260 p.s.i.ga. with nitric oxide at 26° C. The temperature rose to a maximum of 61° C. When the pressure decreased, additional nitric oxide was added to raise the pressure to the initial level. At the end of 30 minutes, the autoclave was vented. A white, metastable solid (43.5 parts, 62% conversion) having a melting point of 83–93° C. was obtained.

Example 39

An autoclave containing 40 parts of di-n-propylamine was pressurized to 290 p.s.i.ga. with nitric oxide at 25° C. The autoclave was heated, and the temperature rose to a maximum of 45° C. At the end of 7 hours, the autoclave was vented. The white, solid reaction product (40 parts, 75-80% conversion) melted with decomposition at 96–98° C. When 13 parts of this solid was heated to 111° C. at atmospheric pressure, 8.5 parts of di-n-propylamine, 2 parts of di-n-propylnitrosamine, and a trace amount of a nitrite were obtained.

Example 40

An autoclave containing 25 parts of di-n-butylamine and 25 parts of water was pressurized to 300 p.s.i.ga. with nitric oxide at 30° C. When the pressure in the autoclave decreased, additional nitric oxide was added to raise the pressure to the initial level. At the end of 7 hours, the autoclave was vented. Filtration of the reaction product yielded 14 parts (45% conversion, 84% yield) of metastable, white solid which melted with decomposition at 97–101° C. Unconverted di-n-butylamine (11.5 parts) was recovered from the filtrate.

Similarly, 25 parts of di-n-hexylamine was caused to react with nitric oxide at 388 p.s.i.ga. at room temperature (ca. 23° C.) for 5 hours. After the autoclave was vented, 12 parts of a metastable, waxy solid, the nitric oxide addition product of di-n-hexylamine, was obtained.

Example 41

An autoclave containing 25 parts of piperidine was pressurized to 300 p.s.i.ga. with nitric oxide at 26° C. At the end of 13 hours, the autoclave was vented. A mixture of a liquid and metastable waxy solid was obtained. The waxy solid was the piperidine-nitric oxide addition product, and the liquid contained N-nitrosopiperidine.

Similarly, 50 parts of piperazine dissolved in an equal weight of methanol was allowed to react with nitric oxide at 350 p.s.i.ga. at 30° C. for 7.5 hours. When the autoclave was vented and the liquid reaction mixture slurried with acetone, 25 parts of the solid nitric oxide addition product of piperazine (M.P. 108–111° C.) was recovered, together with an equal weight of unreacted amine.

All the amine nitric oxide addition products are very soluble in alcohols. Their solubilities in water and in chloroform vary according to the molecular weight. For example, the dimethylamine-nitric oxide addition product is soluble in water and insoluble in chloroform, whereas the dibutylamine adduct is insoluble in water and soluble in chloroform. When silver nitrate is added to water or methanol solutions of these addition products, an insoluble white precipitate is formed which rapidly decomposes to yield metallic silver. The fact that the dimethylamine-nitric oxide addition product decomposes rapidly in moist air, whereas the diethylamine- and dibutylamine-nitric oxide addition products are stable indicates that as the molecular weight of the hydrocarbon substituents on the amino nitrogen increases, the stability of the addition product increases.

These novel, solid addition products apparently are intermediates in the formation of both the nitrosamine and the corresponding disubstituted ammonium nitrite. Thus, when an addition product is heated to a temperature above 66° C. or is added to an aqueous solution of a variable-valence-metal salt, the corresponding nitrosamine is formed. When the addition product is dissolved in methanol, a mixture of the corresponding ammonium nitrite and the nitrosamine is formed. This interrelationship may be summarized by the following diagram in which, for convenience, the reactions of dialkyl amines are illustrated and in which the reactions of amines containing a methylene group alpha to the amino nitrogen and hence capable of giving insoluble addition products with nitric oxide are indicated by broken lines.

Diagram 1

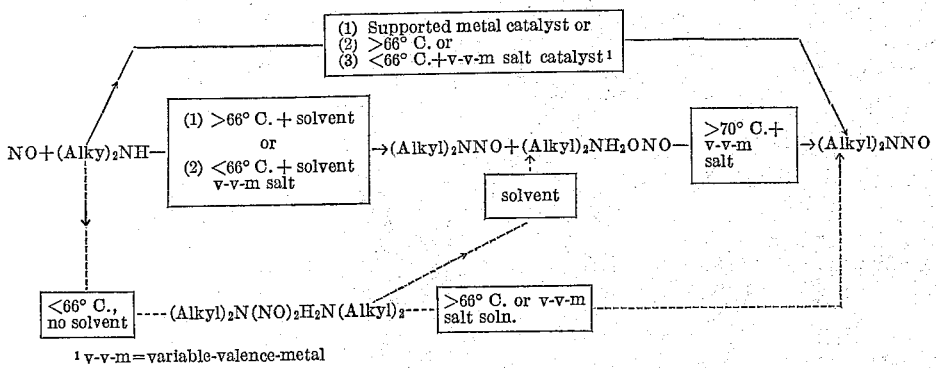

¹ v-v-m = variable-valence-metal

In the course of determining the structure of these amine-nitric oxide addition products, they were found not only to be useful intermediates in the preparation of disubstituted ammonium nitrites and nitrosamines but also to be convertible to novel alkali-metal and divalent metal salts which, in turn, are also nitrosamine intermediates. These metal salts of the addition products have the general formulas:

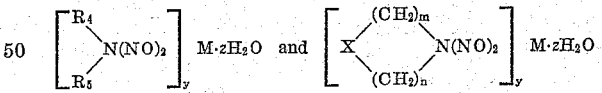

in which $R_4$ and $R_5$ are saturated aliphatic hydrocarbon radicals providing at least one methylene group alpha to the amino nitrogen; X is a $-CH_2-$, $-O-$, or $-NH-$ radical; $m$ and $n$ are integers such that the total number of ring members is 5 to 7; $y$ is an integer of 1 to 2; M is a mono- or divalent cation; and $z$ is ½ to 4. The alkali-metal salts are prepared by carrying out the addition of nitric oxide to the secondary amines in the presence of an aqueous or alcoholic solution of alkali-metal hydroxide or, alternatively, by treating the nitric oxide-amine addition product with alkali-metal hydroxide. The corresponding divalent-metal salt is readily prepared by treating a solution of an alkali-metal salt, particularly an aqueous solution, with a halide or other soluble salt of the divalent metal dissolved in the same solvent. All these salts are convertible to the corresponding nitrosamines by treatment with dilute acid. However, no acid is necessary with the salts of variable-valence metals, such as the nickel and cobalt salts shown in the following examples, because these salts decompose spontaneously to the corresponding nitrosamines on standing. These interrelationships are summarized in the following diagram in which the reactions of dialkyl amines and their derivatives are illustrated, again for convenience only.

Diagram 2

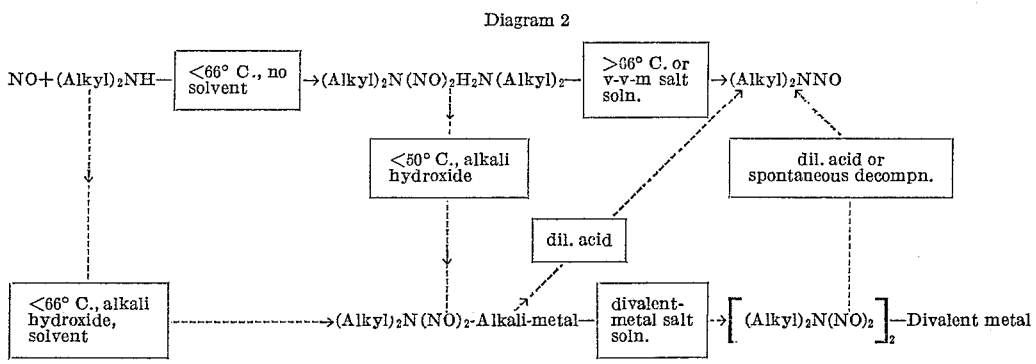

In addition to being nitrosamine intermediates, most of the metal salts are soluble in organic solvents, an important characteristic for gasoline antiknock additives. The salts also burn with brightly colored flames and hence are useful components in pyrotechnic compositions.

The following examples are intended to illustrate various processes for the preparation of these metal salts. Parts are by weight unless otherwise specified.

*Example 42*

An autoclave containing 30 parts of dimethylamine, 20 parts of sodium hydroxide, and 50 parts of water was pressurized to 200 p.s.i.ga. with nitric oxide at 10° C. The temperature rose to a maximum of 25° C. When the pressure decreased, additional nitric oxide was added to raise the pressure to the initial level. At the end of 7 hours, the autoclave was vented. The reaction mixture (109 parts) was treated with solid sodium hydroxide, the resulting slurry was filtered, and the precipitate was recrystallized from isobutanol. Elemental analysis of the dried solid indicated the salt had the empirical formula. $[(CH_3)_2N(NO)_2]Na \cdot \frac{1}{2}H_2O$.

*Example 43*

An autoclave containing 39 parts of diethylamine, 14 parts of potassium hydroxide, and 50 parts of water was pressurized to 300 lb./sq. in. ga. with nitric oxide at 20° C. The autoclave was heated and the temperature rose to a maximum of 62° C. When the pressure decreased, additional nitric oxide was added to raise the pressure to the initial level. At the end of 7 hours, the autoclave was cooled and vented. When solid potassium hydroxide was added to the reaction mixture, 103 parts of a solid having an infrared spectrum similar to that of the dimethylamine derivative was found. This compound was assigned the formula $[(C_2H_5)_2N(NO)_2]K \cdot zH_2O$.

*Example 44*

An autoclave containing 33.5 parts of di-n-propylamine, 12 parts of sodium hydroxide, and 30 parts of water was pressurized to 300 p.s.i.ga. with nitric oxide at 22° C. At the end of an hour, the autoclave was vented. Solid sodium hydroxide was added to the reaction mixture to precipitate the desired salt, the precipitate obtained was recrystallized from isobutanol, and 10 parts of the sodium salt of the diisopropylamine-nitric oxide addition product was obtained. When this salt was dissolved in water and treated with nickel chloride, a green solid, which was shown by infrared spectroscopy to be $[(C_3H_7)_2N(NO)_2]_2Ni \cdot zH_2O$, was obtained.

*Example 45*

An autoclave containing 32 parts of di-n-butylamine, 10 parts of sodium hydroxide, and 75 parts by volume of methanol was pressurized to 300 p.s.i.ga. with nitric oxide at 24° C. When the pressure decreased, additional nitric oxide was added to raise the pressure to the initial level. At the end of 7 hours, the autoclave was vented. The reaction mixture was filtered to remove the insoluble material present and the filtrate evaporated. When the residue was slurried with cyclohexane, 35 parts of a water- and alcohol-soluble salt, shown by infrared spectroscopy to be $[(C_4H_9)_2N(NO)_2]Na \cdot zH_2O$, was obtained.

*Example 46*

An autoclave containing 40 parts of diethylamine, 18 parts of sodium hydroxide, and 50 parts of water was pressurized to 300 p.s.i.ga. with nitric oxide at 22° C. When the pressure decreased, additional nitric oxide was added to raise the pressure to the initial level. At the end of 6½ hours, the autoclave was vented. Calcium chloride (25 parts) was added directly to the reaction mixture (133 parts). The mixture was washed with an excess of ethanol, and the precipitate was filtered. Recrystallization of the solid from isobutanol-ether mixture produced 20 parts of a calcium salt which had an infrared spectrum similar to that of the sodium salt and which, from elemental analysis, had the empirical formula: $[(C_2H_5)_2N(NO)_2]_2Ca \cdot 3H_2O$. Another 12 parts of the salt was isolated on evaporation of the filtrate. Hence, a total of 32 parts of solid calcium salt was produced.

*Example 47*

An aqueous solution of cupric chloride (5 parts of salt in 100 parts of water) cooled to below 5° C. was added portionwise to a cold (below 5° C.) solution of 15 parts of the sodium salt of the diethylamine-nitric oxide addition product in 25 parts by volume of methanol and 25 parts of water. The reaction mixture was covered by a layer of ether. The blue ether layer obtained was separated after each addition of the copper solution. Evaporation of the combined ether layers in a stream of nitrogen yielded a solid, blue residue (approximately 8 parts) which had an infrared spectrum similar to that of the corresponding sodium and calcium salts.

All the novel salts are soluble in alcohols. The divalent-metal salts have limited solubility in water and are soluble in ether. These salts react with silver nitrate, as the parent addition products do, to precipitate metallic silver.

These salts, moreover, react with dialkyl sulfates or with alkyl or aralkyl halides to yield other novel compounds which have been shown by nuclear magnetic resonance spectra to be O-alkylated-N-nitroso-N-disubstituted-aminohydroxylamines. Some of these compounds yield the corresponding nitrosamine when treated with acid. In addition, these new alkylated derivatives are stable and, like other compounds containing the

linkage, may be used as stabilizers, polymerization inhibitors, and insecticides. Their preparation is illustrated by the following examples. Parts are by weight unless otherwise specified. The product in each case was identified by infrared spectroscopy.

*Example 48*

Seventy parts of diethyl sulfate was added dropwise to a methanol solution of the reaction mixture obtained when a mixture of 40 parts of diethylamine and 18 parts of sodium hydroxide in 50 parts of water was treated with nitric oxide at 300 p.s.i. ga. and 21–28° C. for 6½ hours. The mixture obtained was stirred continuously, and the temperature was not allowed to exceed 36° C. After 4⅓ hours, the mixture was extracted with petroleum ether (B.P. 30–60° C.). Distillation of the petroleum ether layer produced 6 parts of nitrosamine and 10 parts (11% conversion) of a liquid product B.P. 52–5° C./0.5 mm., $n_D^{24.5}$ 1.4497) having a molecular weight of 161. Elemental analysis indicated that the compound had the empirical formula $(C_2H_5)_2N(NO)_2C_2H_5$.

*Example 49*

Forty-two parts of a diethylamine-nitric oxide addition product was added to a solution of 10 parts of sodium hydroxide in 15 parts of water. The slurry formed was extracted with ether, methanol (100 parts by volume) was added to the water layer, and then 40 parts of diethyl sulfate was added to the mixture. The mixture was allowed to stand for one hour at 30° C. and then was heated on a steam bath for an additional hour. The residue was extracted with ether, and the ether layer was distilled to yield 20 parts (75% conversion, based on the addition product) of the alkylated derivative,

$(C_2H_5)_2N(NO)_2C_2H_5$

*Example 50*

Diethyl sulfate (35 parts) was added dropwise at 50–60° C. to the reaction mixture produced by treating 32 parts of di-n-butylamine and 10 parts of sodium hydroxide in 75 parts by volume of methanol with nitric oxide at 300 lb./sq. in. ga. and room temperature. The mixture produced was treated with ammonium hydroxide to destroy excess diethyl sulfate and then extracted with ether. Distillation of the ether layer yielded 31 parts (57% conversion, based on di-n-butylamine) of the alkylated product, $(C_4H_9)_2N(NO)_2C_2H_5$. When the akylated derivative 14.5 parts) was heated with concentrated hydrochloric acid (25 parts by volume) for 2 hours, a product (4 parts) shown by infrared spectroscopy and elemental analysis to be di-n-butylnitrosamine was obtained.

*Example 51*

Thirty parts of n-butyl iodide was added to the reaction mixture obtained by treating 37 parts of di-n-butylamine and 15 parts of sodium hydroxide in a solution of 14 parts of water and 75 parts by volume of methanol with nitric oxide at 230 lb./sq. in. ga. and 27° C. for 7 hours. The mixture was allowed to stand for 15 hours and then was diluted with water and extracted with ether. The ether was removed by evaporation, and vacuum distillation of the residue yielded 7 parts (12% conversion, based on di-n-butylamine) of a liquid which boiled at 110–111° C. at 5 millimeters and which was shown by infrared spectroscopy to be the alkylated derivative,

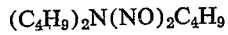
$(C_4H_9)_2N(NO)_2C_4H_9$

*Example 52*

Benzyl bromide (60 parts) was added to a solution of 43 parts of the sodium salt of diethylamine-nitric oxide addition product in 100 parts by volume of methanol, and the mixture was heated to 50° C. When the evolution of nitric oxide ceased, after 30 minutes, the mixture was filtered and the methanol was removed from the filtrate by vacuum evaporation. The residue was slurried in water and extracted by ether. The liquid obtained (20 parts, 16% crude conversion) was shown by infrared spectroscopy to be the alkylated derivative,

$(C_2H_5)_2N(NO)_2CH_2C_6H_5$

The liquid alkylated derivatives are insoluble in water and soluble in organic compounds such as alcohols, acetone, chloroform, benzene, and saturated hydrocarbons. Unlike the addition products and their metallic derivatives, the alkylated addition products do not react with silver nitrate to form metallic silver.

The foregoing structural formulas for the novel amine-nitric oxide addition products and their salts and alkylated derivatives were established only after extensive analytical investigation including elemental analyses and determinations of solubilities, chemical properties, and molecular weight. The nuclear magnetic resonance spectrum of the ethyl derivative of the diethylamine-nitric oxide addition product indicates that two of the ethyl groups in the molecule are attached through a different linkage than the third. Hence, on the basis of the empirical formula, the following structure has been assigned to the molecule.

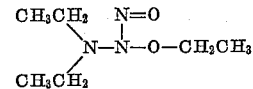

Thus, if no rearrangement occurs in the conversion of the amine nitric oxide addition products to their metallic salts and alkylated derivatives, these compounds are all hydroxylamine derivatives.

The foregoing examples illustrate the wide scope of the present invention. The effects of varying the interdependent reaction variables, such as maximum temperature, retention time, catalyst concentration, and presence of solvent, on the products obtainable by the reaction of nitric oxide and secondary amines or tertiary amines having at least one alkyl group attached to the amino nitrogen are illustrated. The examples show clearly that by a suitable combination of reaction variables, the nitrosamine may be prepared directly or obtained by further treatment of any of the intermediate products isolated. The variety of reaction conditions under which the intermediate disubstituted ammonium nitrites may be formed is shown both by examples and by a tabular summary. Certain amines, i.e., those in which a methylene group is alpha to the amino nitrogen, have been shown under suitable reaction conditions to form metastable solids which can be isolated and characterized and which not only are capable of being treated further to produce either the intermediate disubstituted ammonium nitrites or the corresponding nitrosamines, but also form useful salts and alkylated derivatives, which, in turn, also are capable of being converted to the corresponding nitrosamines. Evidence for the structure of these novel intermediate products has been presented. The examples are limited to batchwise preparation in order to illustrate more clearly the scope of the invention, but it is obvious that the addition of nitric oxide to secondary amines or tertiary amines having at least one alkyl group attached to the amino nitrogen could be carried out continuously. Specific applications of a continuous process are given in the foregoing disclosure. Hence, it is obvious that many variations in the process can be made without departing from the basic concept of the invention. I intend, therefore, to be limited only in accordance with the following claims.

I claim:
1. As a novel compound, 2,2′,4,4′-tetrachlorodiphenylnitrosamine.
2. In a process wherein a nitrosamine is prepared by the reaction of nitric ovide with an amine selected from the class consisting of secondary amine and tertiary amine having at least one alkyl group attached to the amino nitrogen, the inclusion of a catalyst for the reaction selected from the group consisting of palladium-on-charcoal, nickel-on-charcoal, rhodium-on-charcoal, and the sulfides, chlorides, cyanides, nitrates and pyridinium chlo- rides of manganese, cobalt, chromium, copper, nickel and iron.

3. A process of claim 2 wherein the nitrosamine is diphenylnitrosamine and the amine is diphenylamine.

4. A process of claim 2 wherein the nitrosamine is N-nitrosodiethanolamine and the amine is diethanolamine.

5. A process of claim 2 wherein the nitrosamine is dimethylnitrosamine and the amine is dimethylamine.

6. A process of claim 5 in which the catalyst is cupric chloride.

7. A process of claim 5 in which the catalyst is palladium-on-charcoal.

References Cited in the file of this patent

Schmid: Monatshefte für Chemie, vol. 85, pages 424–440 (1954).

Schwarz et al.: Berichte Deut. Chem., vol. 67, pages 1110–1111 (1934).

UNITED STATES PATENT OFFICE
CERTIFICATE OF CORRECTION

Patent No. 3,153,094                                October 13, 1964

Edward L. Reilly

It is hereby certified that error appears in the above numbered patent requiring correction and that the said Letters Patent should read as corrected below.

Column 2, line 51, for "4.5/" read -- 4.5% --; column 7, line 32, for "alphatic" read -- aliphatic --; column 8, line 26, before "Secondary" insert an opening parenthesis; column 9, line 3, for "parts of 42%" read -- parts (42% --.

Signed and sealed this 30th day of March 1965.

(SEAL)
Attest:

ERNEST W. SWIDER
Attesting Officer

EDWARD J. BRENNER
Commissioner of Patents